April 14, 1964

B. C. MATHEWS 3,129,073

CONTINUOUS GRAIN DRYER

Filed July 25, 1961

INVENTOR.
BERNARD C. MATHEWS
BY
Mason, Kolehmainen, Rathburn and Wyss
ATTORNEYS.

April 14, 1964  B. C. MATHEWS  3,129,073
CONTINUOUS GRAIN DRYER

Filed July 25, 1961  7 Sheets-Sheet 4

INVENTOR.
BERNARD C. MATHEWS
BY Mason, Kolehmainen,
Rathburn and Wyss
ATTORNEYS.

April 14, 1964

B. C. MATHEWS 3,129,073

CONTINUOUS GRAIN DRYER

Filed July 25, 1961

INVENTOR.
BERNARD C. MATHEWS

BY Mason, Kolehmainen,
Rathburn and Wyss
ATTORNEYS.

April 14, 1964

B. C. MATHEWS 3,129,073

CONTINUOUS GRAIN DRYER

Filed July 25, 1961

INVENTOR.
BERNARD C. MATHEWS
BY
Mason, Kolehmainen, Rathburn and Wyss
ATTORNEYS.

United States Patent Office 3,129,073
Patented Apr. 14, 1964

3,129,073
CONTINUOUS GRAIN DRYER
Bernard C. Mathews, Box 414, Crystal Lake, Ill.
Filed July 25, 1961, Ser. No. 128,627
6 Claims. (Cl. 34—56)

This invention relates to dryers and, more particularly, to grain dryers utilizing heated air to reduce the moisture content of harvested grain. This application is a continuation-in-part of application Serial No. 21,266, filed April 11, 1960, now abandoned.

While the dryer according to the present invention may be used to reduce the moisture content of any desired grain, such as barley, oats, wheat, corn and milo, the present dryer is particularly advantageous when used to dry corn.

Continuous grain dryers are known which permit the operator to bring grain in from the field, place it in the dryer, and return to the field to continue the harvesting. Meanwhile, the grain passes through the dryer and the dryer automatically feeds dried cooled grain into a suitable wagon or bin. During the drying operation, an overhead grain storage bin empties into the dryer while the operator is harvesting more grain; thereafter, when the operator returns with another load of wet grain it can immediately be placed into the hopper of the dryer. Moreover, large grain dryers have excess capacity over that required by the small farmer and such large dryers are commercially not economical for the small farmer both from the point of initial cost or investment to the farmer and from the point of operating expense. As the dryers consume a substantial amount of heating fuel, it is necessary that the dryer have an economical fuel rate and heat recovery. Such economical operations have heretofore been available only in the larger dryer sizes.

Moreover, the grain dryers of the prior art have not been entirely satisfactory in their means of discharging or metering grain from the dryer so that the kernels of grain are not broken or crushed. This difficulty has been particularly pronounced in the drying of large grain kernels, such as corn. One additional difficulty has been experienced in uniformly controlling the dryness of the grain discharged from the grain dryer, particularly when the grain dryer is so positioned that the wind may influence the air passing through a portion thereof, and in the starting up of the device. Moreover, the dryer may be subjected to moisture fluctuations when fed with undried grain of varying moisture contents.

It is therefore an object of the present invention to provide an improved grain dryer which overcomes the aforementioned difficulties.

A further object of the present invention is to provide an improved grain dryer having increased operating economy.

A further object of the present invention is to provide a grain dryer having improved heat recovery.

A further object of the present invention is to provide a grain dryer having improved means for drying and cooling the grain.

A further object of the present invention is to provide a grain dryer with an improved metering means for grain discharge which minimizes broken kernels.

A further object of the present invention is to provide a grain dryer with an improved control system for the fuel thereof.

Yet another object of the present invention is to provide a grain dryer with an improved system for controlling the dryness of the grain discharged therefrom.

Further objects and advantages of the invention will become apparent as the following description proceeds and the features of novelty which characterize the invention will be pointed out with particularity in the claims annexed to and forming a part of this specification.

Briefly stated, according to the present invention, the improved grain dryer comprises an enclosure having a plurality of grain columns each having perforated side walls through which air may be directed. Heated air for drying is directed through the upper portion of the columns and cooling air is directed through the lower portion of the columns. In a preferred embodiment, the columns are tapered at the bottom so as to increase the air movement at the bottom of the column thereby producing good cooling and high air velocity which cleans the grain by throwing fine material or chaff out of the columns. An adjustable slide is provided which may be moved up or down the column area so as to increase or decrease the respective drying and cooling areas of the columns and to separate the heating and drying air of the columns. According to a further aspect of the present invention, the grain is discharged from the columns onto an auger feeding device by means of a metering device consisting of a shaft having longtudinally extending radial blades and driven in a restriction at the bottom of the column at a preselected adjustable rate so as to discharge the grain from the columns at a predeterminable rate. A further aspect of the present invention is the provision of a folding wet grain storage bin which reduces the height of the unit for transportation on the highway. According to a further aspect of the present invention, heat recovery ducts are provided along the sides of the columns outwardly of the air separation slide which collect heated air from the bottom of the heated portions and cooling air from the upper end of the cooling portions and conducts this air back to the heated air fan to be combined with newly heated air and recirculated, thereby recovering heat available in this portion of the grain dryer which would otherwise be wasted. Moreover, according to a further aspect of the present invention, the improved grain dryer is provided with an improved and simplified control system for the fuel supply which automatically shuts off the fuel supply if the power to the circulating fan fails, or if the drying columns run out of grain.

According to yet a further feature of the present invention, the final moisture content of the grain passing through the dryer is controlled by means associated with the feeding devices to control the rate of discharge of the grain passing through the dryer in response to the temperature of the grain as a function of its dryness or moisture content. Moreover, each of the feeding devices associated with respective ones of the grain columns are independently controlled to compensate for variation which may occur in the drying columns as a result of the direction of the wind and the like.

The nature of the invention will best be understood when described in connection with the accompanying drawings, in which.

Figure 2:
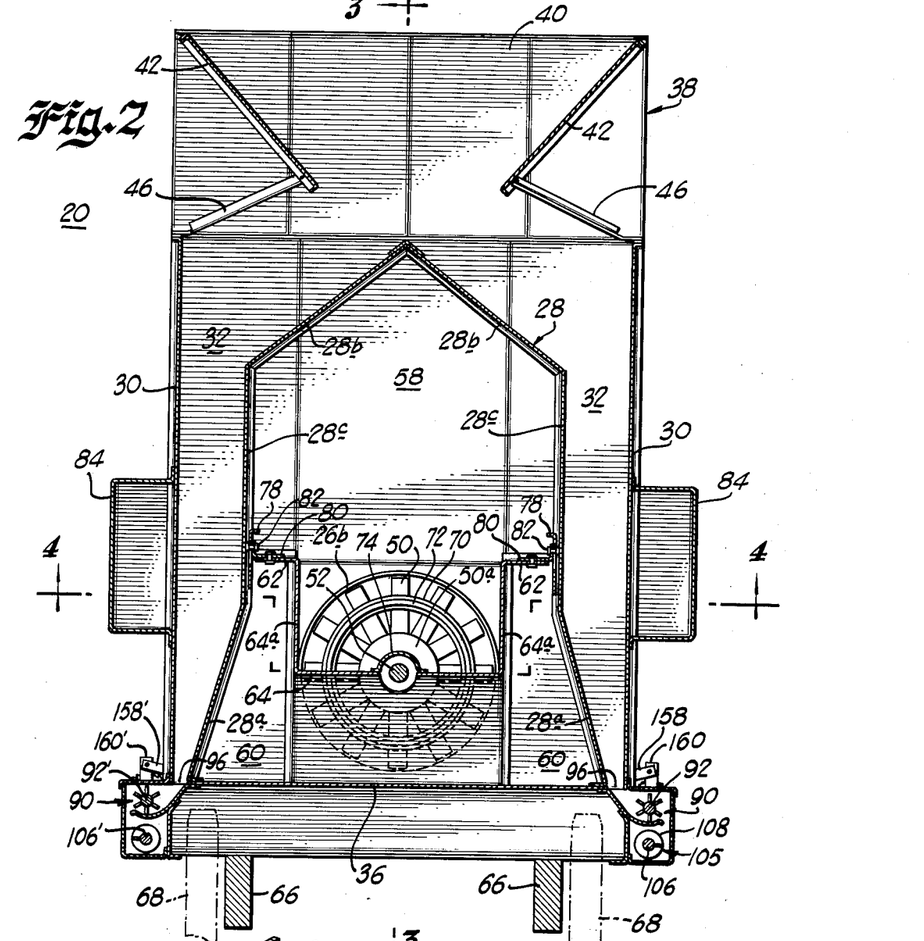
FIG. 2 is a rear sectional view of the grain dryer of FIG. 1 taken along plane 2—2 of FIG. 1.

Referring to the drawings, there is illustrated therein an improved grain dryer 20 according to the present invention. The grain dryer 20 includes a box-shaped housing 22 having a pair of end walls 24, 26 each end of which is interconnected by an inner and outer perforated side wall 28, 30 respectively to form a pair of grain columns 32 interconnected by the end walls 24, 26. The inner side walls 28, as best seen in FIG. 2, include a lower tapered portion 28a, an upper tapered portion 28b, and a central substantially vertical portion 28c so that the grain columns 32 formed by walls 28 and 30 are funnel shaped, being wide at the top and gradually tapering toward the bottom thereof. Moreover, the inner upper edge of the upper portions 28b are joined so that the columns are substantially laterally spaced and form an enclosed air cavity within the housing 22. The bottom of this air cavity is enclosed by a floor 36 to complete the enclosure of the housing 22.

In order to furnish means for storing wet grain brought in from the harvest, there is positioned above the funnel-like grain columns a storage bin 38 on top of the housing 22. The ends of the storage bins 38 include vertical panels 40 and the sides of the bin 38 include panels 42 which are inclined inwardly to form a funnel-like storage bin 38 emptying into the top of the grain columns 32.

Figure 1:
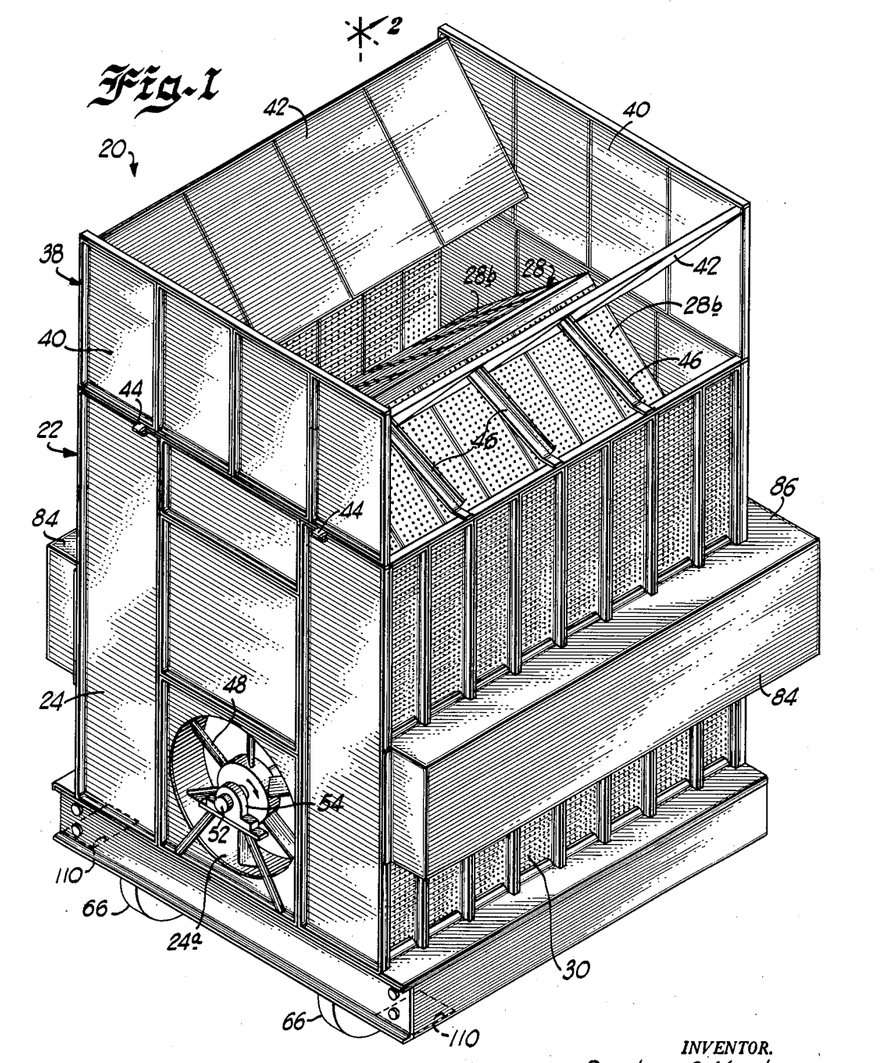
FIG. 1 is a perspective view of the improved grain dryer of the present invention.

In order to reduce the height of the dryer 20 for transportation along the highway and otherwise, the storage bin 38 may be folded. Specifically, the end panels 40 are hinged at 44 (FIG. 1) and the inclined side panels are removable so that the end panels 40 may be folded over the top of the housing 22 when the grain dryer 20 is not in use. The side panels 42 may then conveniently be stored on top of the housing 22. The side panels 22 may readily be bolted or otherwise secured to the vertical panels 40 and the lower edge of the side panels 42 are held inwardly by a plurality of separable struts or braces 46 secured to the side panels 42 and the tops of the outer walls 30.

In order to force air through the grain columns 32, there is provided a cooling or cold air fan or fan element 48 and a drying or hot air fan or fan element 50 connected near opposite ends of a drive shaft 52 and each connected to force air inwardly of the air cavity between the grain columns. The drive shaft 52 is centrally positioned longitudinally between the grain columns 32 and has one end rotatably mounted in a bearing 54 and is mounted near its other end in a bearing 56, but extends sufficiently forward of the bearing 56 to permit connection to suitable drive means as hereinafter more fully described. The forward end wall 26 of the housing 22 is provided with an opening 26a (FIG. 3) and the rear end wall 24 is provided with an opening 24a (FIG. 1), each aligned with the respective fans 50 and 48 to provide an intake for the air. Moreover, each opening 26a and 24a may be provided with a cylindrical shield 26b, 24b, respectively, radially spaced from the fans 40 and 48 in order to provide a more efficient air intake.

Figure 3:
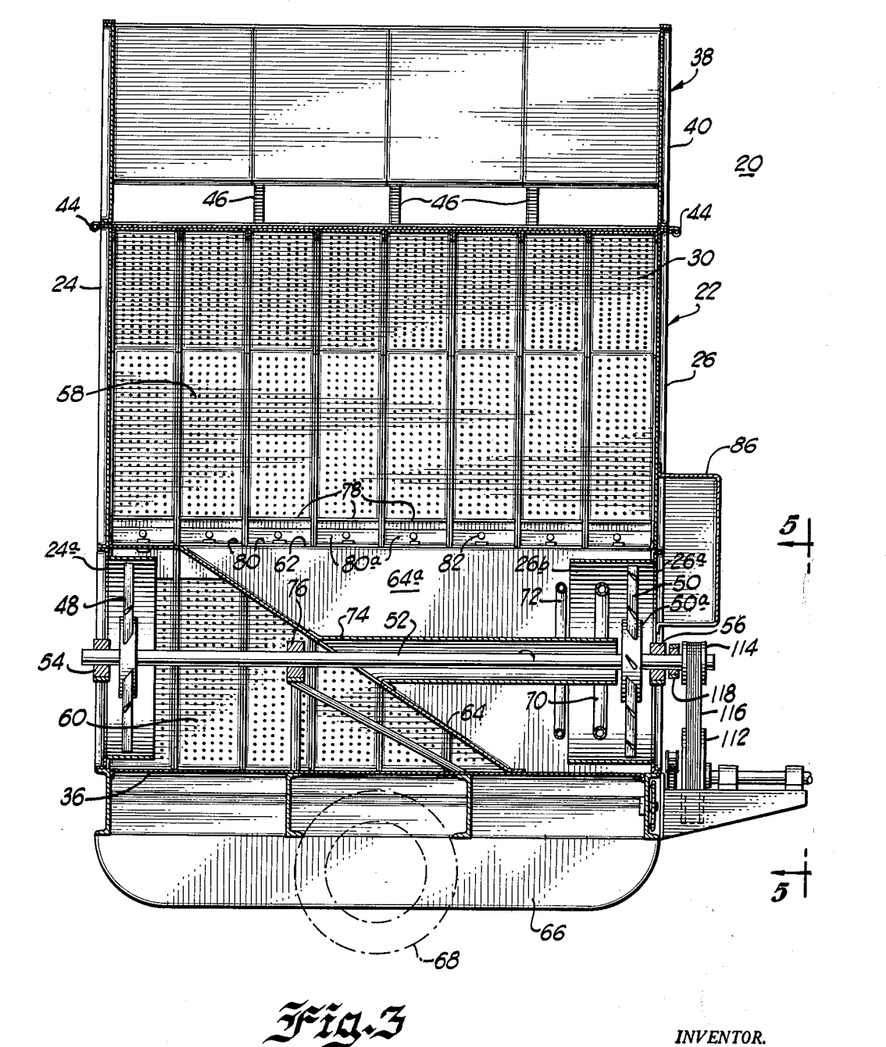
FIG. 3 is a side sectional view of the grain dryer taken along plane 3—3 of FIG. 2, assuming that FIG. 2 shows the entire dryer.
Figure 4:
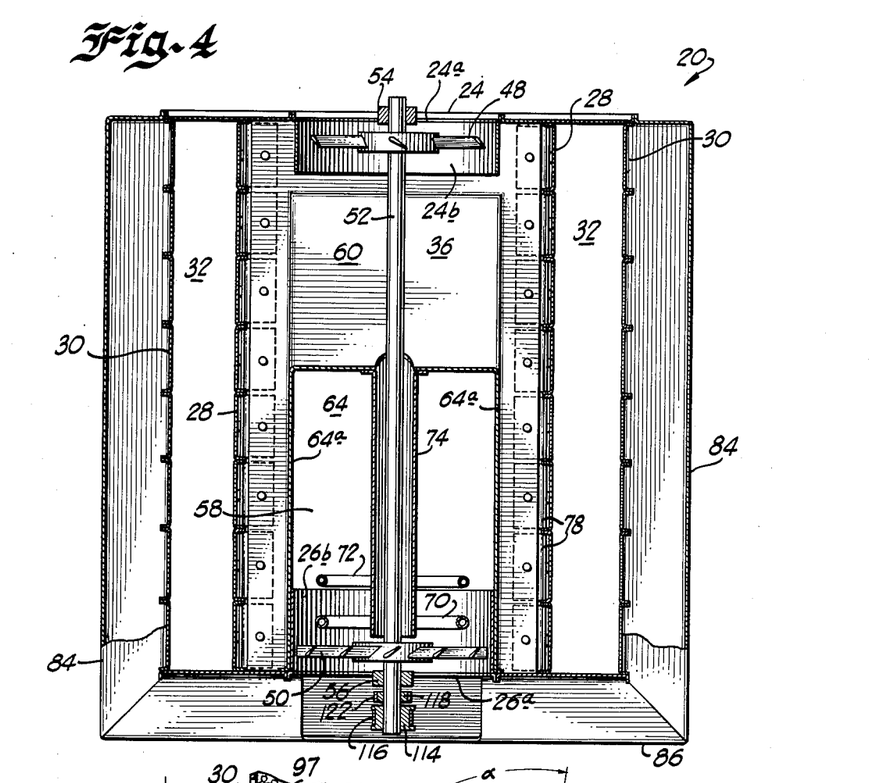
FIG. 4 is a bottom sectional view of the dryer taken along plane 4—4 of FIG. 2, assuming that FIG. 2 shows the entire dryer.

In order to provide for the heating and cooling of the grain, means are positioned between the respective columns 32 of grain so as to divide the air cavity therebetween into an upper or hot air chamber 58 and a lower or cool air chamber 60. Such partition means includes a horizontally positioned partition 62 having a central inclined portion 64 forming the center portion of the partition 62 to thereby direct heated air from fan 50 into the upper chamber 58 and to deflect cool air drawn in by fan 48 into the lower chamber 60. As is best seen in FIG. 3, the centrally inclined portion 64 is vertically inclined downwardly from the horizontally positioned partition 62 near the cool air fan 48 and runs to the floor 36 of the housing 22 at a point near the hot air fan 50. Moreover, the inclined portion 64 is connected to the horizontally positioned partition 62 by interconnecting vertical portions 64a, best seen in FIG. 2. The horizontally positioned partition 62 provides a means whereby the cool air fan 48 directs cool air into the lower or cool air chamber 60 of the grain dryer 20 and outwardly through the lower portions of the grain columns 32, and the hot air fan 50 directs heated air into the upper or hot air chamber 58 of the grain dryer 20 outwardly through the upper portions of the grain columns 32.

In order to facilitate setting up of the grain dryer 20, the grain dryer may be provided with a pair of skids 66 on its bottom side. Moreover, in order to facilitate movement of the grain dryer 20 on the highway or otherwise, the grain dryer 20 may be provided with a pair of removable wheels 68 shown in phantom in FIGS. 2 and 3.

In order to provide means for heating the air drawn in by the hot air fan 50, there is provided a fuel burner 70 spaced in the hot air chamber 58 just inside the hot air fan 50. Spaced inward of the fuel burner 70 is a vaporizer 72.

In order to prevent the shaft 52 from overheating as hot air is forced into the upper chamber 58, the shaft is enclosed throughout this chamber by a cylindrical housing 74 which is open at both ends and which communicates between the cool air chamber 60 and the hot air chamber 58. The shaft 52 is supported by a central bearing 76 spaced sufficiently from the open end of the housing 74 so that the bearing 76 deos not interfere with the passage of air into the left hand end of the housing 74 as viewed in FIG. 3. On the other hand, the hot air fan 50 has an enlarged hub 50a of greater diameter than the housing 74 and spaced close to the hot air side of the housing. In this manner, the hub 50a obstructs the flow of hot air into the housing 74 around the shaft 52; cool air will then pass through the housing 74 around the drive shaft 52 from the cool air chamber 60 to the hot air chamber 58. This cool air will prevent overheating of the shaft 52.

The grain in the upper portions of the grain columns 32 is dried by the passage of heated air through the grain columns and through the perforations in the inner and outer side walls 28 and 30. The heated air, of course, heats the grain in the grain columns 32 as well as drying the grain. As the grain passes down through the grain columns, in a manner hereinafter described, the heated grain is cooled by the passage of cool air from the lower air chamber 60 through the perforations in the inner and outer side walls 28 and 30 below the partition 62.

Figure 9:
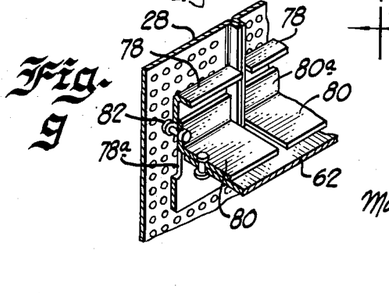
FIG. 9 is an enlarged view of portion 9 of FIG. 2 illustrating the slide for adjusting the heating and cooling zones of the grain columns.

In order to separate the heating and cooling zones in the grain columns, and in order to permit adjustable proportioning of the heating and cooling zones, there is provided a plurality of shields or slides 78 along the outer edges of the horizontal partition 62, as best shown in FIG. 9. A plurality of angle or L-shaped plates 80 are secured around the periphery of the partition 62. These plates have an upstanding leg 80a forming a vertical flange around the sides of the partition 62. The slides 78 have elongated or slotted openings 78a through which pass a plurality of fasteners or bolts 82 securing the slides 78 between the inner perforated wall 28 and the upstanding flanges 80a on the angle plates 80. Because of the elongated openings 78a in the slides 78, the slides 78 may be adjustably positioned vertically merely by loosening the bolts 82, moving the slides 78 to the desired position and then tightening bolts 82 to secure the slides in the selected position. The slides 78, of course, are not perforated and thereby provide a shielding effect against the vertical portion 28b of the inner wall 28 so that vertical adjustment of the slide 78 effectively varies the proportionate size of the hot air chamber 58 with respect to the coil air chamber 60, that is, the effective length of the hot or drying zone in the columns 32 is variable with reference to the cooling zone in these columns.

In order to recover some of the heat which passes through the grain columns 32 with the heated air, there is provided along the sides of the dryer 20 a pair of side air ducts 84 which connect at their forward ends to a transverse air duct 86. The ducts 84 and 86, of course, are not perforated; the side ducts 84, however, are open on the inner side to the perforated outer walls 30 of the dryer 20. The transverse air duct 86 communicates at its center with the air intake opening 26a for the hot air fan 50 so that the hot air fan 50 is effective to draw air from the duct 86 and therefore from the side air ducts 84. At the same time, a portion of the air passing through the perforated walls 28 and 30 is received by the side air ducts 84 for recirculation to the hot air chamber 58 through the transverse air duct 86. Moreover, the side air ducts 84 are positioned along the sides of the columns just outwardly of the slides 78 separating the hot and cool air zones of the grain column 32. It will be appreciated that, since the grain in the grain column 32 moves downwardly, in a manner hereinafter described, the air passing through the outer walls 30 just above the shield 78 will be the hottest and driest, i.e., will have picked up the least humidity since, by the time the grain has reached this position, the grain is substantially dry and the grain has been heated by the passage of air in the upper zones. Moreover, the cooling air passing through the grain columns just below the slides 78 will be passing through the hottest zone and consequently, will also be at its highest temperature. For this reason, the ducts 84 are conveniently located to collect the most desirable heated air and thereby produce the most efficient heat recovery.

Figure 6:
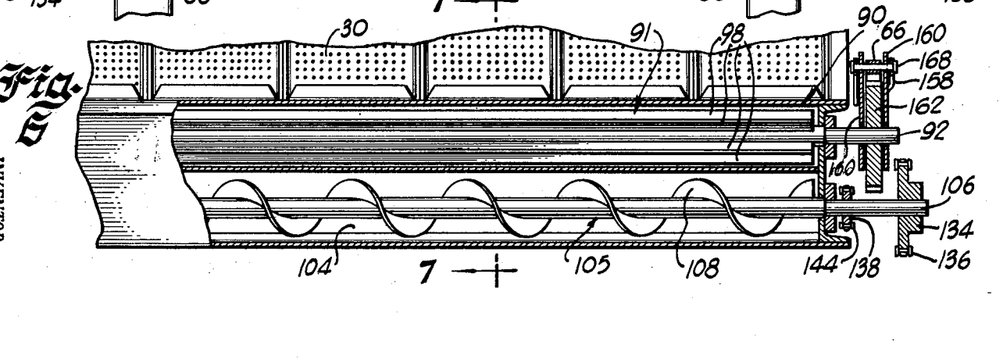
FIG. 6 is an enlarged fragmentary sectional side view of the grain dryer taken along plane 6—6 of FIG. 5 and illustrating the grain discharge mechanism.
Figures 7, 8:
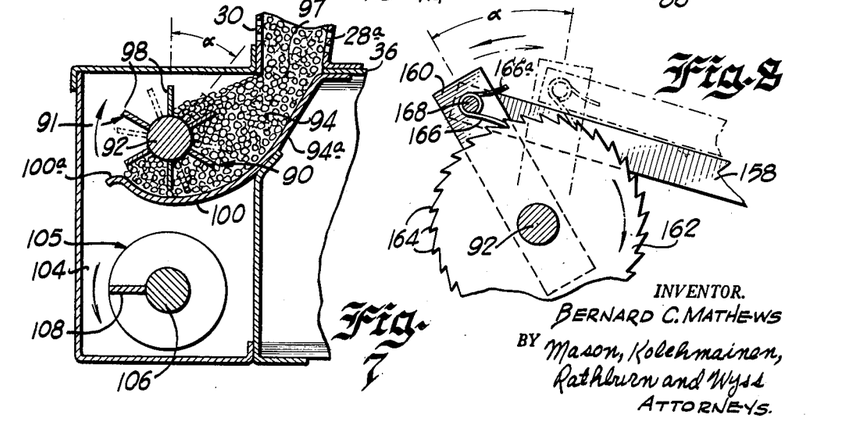
FIG. 7 is an enlarged sectional front view illustrating the grain discharge means of FIG. 6.
FIG. 8 is an enlarged front view illustrating the ratchet and pawl assembly driving the grain discharge mechanism.

In order to discharge the grain from the grain columns 32 there is provided, along each side of the dryer and adjacent the bottom of each drying column, a grain discharge means indicated generally at 90. The grain discharge means comprises a pair of metering devices 91 on a pair of metering shafts 92, 92' (FIGS. 2, 6 and 7) on respective sides of the dryer in a pair of chambers 94 below a lower discharge opening or restriction 96 at the bottom of each grain column 32. In accordance with an important feature of the invention the metering shafts, such as the shaft 92, are not positioned directly below the discharge openings 96 but instead are horizontally offset to one side therefrom and the grain indicated at 97 in FIG. 7, flows into the metering device 91 along an inclined side wall 94a of the metering chamber 94 which extends from the discharge opening 96. The metering shafts 92 and 92' are provided with a plurality of longitudinally arranged radially extending blades 98 which substantially fill the cross section of the compartment 94 but are spaced from a bottom partition or wall 100 so as to provide a substantial clearance between the blades 98 and the wall 100, this clearance being larger than the largest grain kernels to be dried. Preferably the clearance between the blades 98 and the wall 100 is of the order of one-half inch. By offsetting the metering shaft 92 with respect to the opening 96, the blades 98 function to block or hold back the grain, in the absence of rotation of the shaft 92, while, at the same time, permitting a large clearance between the blades 98 and the bottom wall 100. At the same time the offset position of the shaft 92 assures that the grain, which assumes an inclined upper surface as shown in FIG. 7, will not overflow around the upper edge of the blades 98 and thus bypass the metering device. In this connection it will be understood that if the shaft 92 were not offset with respect to the opening 96 a relatively close clearance between the blades 98 and the opening would be required with the result that cracking of the grain kernels would be produced as the shaft is rotated. Also, with such an arrangement a different clearance would be required for different sizes of grain. However, when the shaft 92 is offset in the manner described above, a substantial clearance may be employed which is sufficient to accommodate even the largest size grain kernels without producing any cracking thereof during the metering operation.

The metering shaft 92 is rotated in intermittent angular steps in the direction of the arrow shown in FIG. 7, by means to be described in more detail hereinafter, so that the portion of the grain which is positioned ahead of the lowermost one of the blades 98 is gradually pushed over the inclined lip 100a of the bottom wall 100 and falls into a lower auger chamber 104. By varying the angular amount the shaft 92 is moved for each step and by changing the repetition rate of this stepping action the amount of grain discharged from the metering device may be accurately controlled over a wide range of values, while, at the same time, assuring that no grain kernels will be cracked or broken since the blades 98 function merely as an adjustable gate to hold back the flow of grain down the inclined wall 94a.

In order to remove the grain from the auger chamber 104 there is located a feed screw auger 105 on each of a pair of auger shafts 106, 106' and each having a helical feed vane 108 so that rotation of the auger shafts 106, 106' will move the grain in the chamber 104 axially along the feed auger 105 and will discharge the grain through discharge means or openings 110 (FIG. 1) at the rear end of the lower chamber 104.

Any desired power may be used to operate the shaft 52 and the metered discharge means 90. For example, there may be provided a power wheel 112 (FIG. 5) which may be connected to the conventional power takeoff of a tractor or which may be connected to a separate source of power such as an electric motor. The power wheel 112 is in turn connected to a power pulley 114 by a belt 116. The pulley 114 is keyed or otherwise secured to the drive shaft 52 of the fans 48 and 50. The drive shaft 52 also carries a feed drive pulley 118 keyed or otherwise secured thereto and connected to a spring loaded variable drive pulley arrangement 120 by a belt 122. The variable speed pulley 120 in turn drives a discharge drive pulley 124 by means of a belt 126. The belts 122 and 126 are preferably V-belts, and the pulley 120 is of the continuously adjustable V-belt type, so that the relative speed of the discharge drive pulley 124 and the feed drive pulley 118 may be varied by adjustment of a hand wheel 128. The drive pulley 124 is secured on a shaft 130 with a sprocket pinion 132 keyed or otherwise secured to the shaft 130 to rotate with the discharge drive pulley 124. The sprocket pinion 132 is drivingly connected by a chain 136 to a sprocket gear 134 keyed or otherwise secured to one of the auger shafts 106 which mounts the auger 108. In this manner, the feed auger 105 is driven from the drive shaft 52 and the speed of the feed auger 105 may be varied by adjustment of the idler pulley 120 through the hand wheel 128 to provide a fine or vernier adjustment of the grain discharge rate.

The metering shafts 92 and 92' are driven in intermittent steps from the sprocket gear 134 through a system of gears, cranks and crossbars. Specifically, a sprocket pinion 138 is keyed or otherwise secured to the auger shaft 106 so as to turn with the auger shaft 106 and is drivingly connected to a crank mechanism shown generally at 140 and including a sprocket gear 142 drivingly connected to the sprocket pinion 138 by a chain 144. The sprocket gear 142 has a crank bar 146 connecting a crank lever 148 with a crossbar 150. The crank lever 148 is pivotally mounted to the crank bar 150 at hinge 142 and is pivotally mounted to the crank bar 146 at hinge 154; the crank bar 146, however, contains a plurality of pivot points indicated at 156 so that the crank arm 148 may be pivotally connected to the sprocket gear 142 at selective radial positions along the gear. A ratchet arm 158 is rigidly connected to one end of the slide bar 150 and extends away from this end of the bar 150 at a slight angle thereto. The free end of the ratchet arm 158 is bifurcated to provide a yoke which is pivotally connected to the outer ends of a pair of ratchet levers 160, as best shown in FIG. 8. The other ends of the ratchet levers 160 are pivotally mounted on the metering shaft 92 so that the levers 160 will oscillate about the metering shaft 92 as a center in response to reciprocating movement of the slide bar 150, as hereinafter described. A ratchet drive wheel 162 having a plurality of ratchet teeth 164 is keyed or otherwise secured to the metering shaft 92 between the levers 160 for rotation with the shaft 92. A pawl 166 is loosely mounted on a pivot pin 168 which pivotally connects the levers 160 to the yoke end of the arm 158 and the pawl 166 is adapted to engage a selectable number of teeth 164 of the ratchet wheel 162 for each reciprocation of the bar 160, thereby to advance the ratchet gear 162 a predetermined distance and rotate the shaft 92 in intermittent steps.

In operation, rotation of the sprocket gear 142 will oscillate slide bar 150 due to its interconnection with the crank arm 148. This, in turn, will oscillate the ratchet lever 160 through its interconnection with slide bar 150 through ratchet arm 158. As the slide bar 150 moves to the right, as viewed in FIGS. 5 and 8, the pawl 166 will engage a tooth of the ratchet wheel 162 and will advance the wheel to the position illustrated in phantom in FIG. 8. On the return stroke of the slide bar 150 to the left, the pawl 166 will slide freely over the teeth 164 of the ratchet wheel 162 and will be returned to its original position as shown in solid lines in FIG. 8. The length of stroke of the slide bar 150 may be adjustably selected by the radial positioning of the pivot 154 to selected ones of the pivot points 156 of sprocket gear 142. Accordingly, movement of the crank arm 148 radially outward on the sprocket gear 142 will increase the length of stroke of the slide bar 150. The number of teeth picked up, and therefore the angular displacement of the ratchet wheel 162 for each revolution of the sprocket gear 142, is dependent upon the length of stroke of the slide bar 150, and, in this manner, the intermittent rotation of the metering shaft 92 may be varied over relatively wide limits so as to provide a wide range of control over the rate of discharge of the grain from the grain columns 32. In a typical machine, the stroke may be adjusted to feed from one tooth to ten teeth on the ratchet wheel 162 for each revolution of the sprocket gear 142, thereby providing a range of ten to one for metered discharge of the grain. In addition, the variable drive pulley 120 may be adjusted independently of the length of stroke of the slide bar 150 so as to provide a fine or vernier adjustment of the rate of grain discharge. In this connection, it will be understood that the auger 105 is so arranged and designed that it will satisfactorily carry the metered grain to the discharge opening 110 at the end of the chamber 104 under conditions of maximum discharge rate from the column 32, i.e., when the stroke of the slide bar 150 is adjusted to its maximum value. If, for any reason, it is desired to terminate grain discharge, the pawl 166 may be disengaged by flipping the pawl over so that a tongue 166a rides on the teeth of the wheel 162 without meshing therewith.

Figure 5:
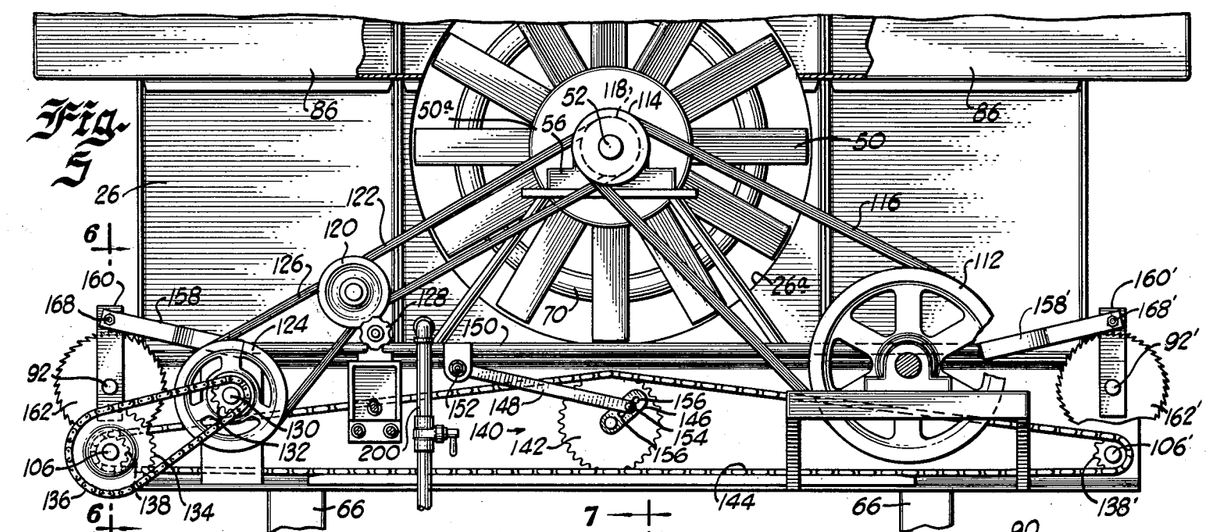
FIG. 5 is a partial front view of the grain dryer taken along plane 5—5 of FIG. 3, assuming that FIG. 3 shows the entire dryer.

While the above description of the grain discharge drive mechanism has been directed toward the discharge means 90 on the left side of the dryer 20, as viewed in FIG. 5, the grain discharge means on the right side of the grain dryer 20 operates from the drive mechanism on the left side in a manner similar to that described above. Specifically, a sprocket pinion 138', which is keyed to the auger shaft 106', is driven by the chain 144. Also, the right hand end of the slide bar 150 is provided with an inclined rigid arm portion 158' having a bifurcated end which is pivotally connected to a pair of levers 160', the levers 160' being pivotally mounted on the metering shaft 92' on either side of a ratchet wheel 162'. The pivot pin 168' loosely mounts a pawl similar to the pawl 166 which engages a tooth on the ratchet wheel 162' each time the slide bar 150 moves to the left as viewed in FIG. 5. Accordingly, the metering shafts 92 and 92' are alternatively driven in intermittent steps from the common slide bar 150. In this connection, it will be noted that the slide bar 150 is supported only on the pivot pins 168 and 168' at the ends of the arms 158 and 158' so that the bar 150 can be moved up and down as well as being reciprocated, thereby permitting the above described wide range of adjustment of grain discharge.

Figures 10, 11, 12:
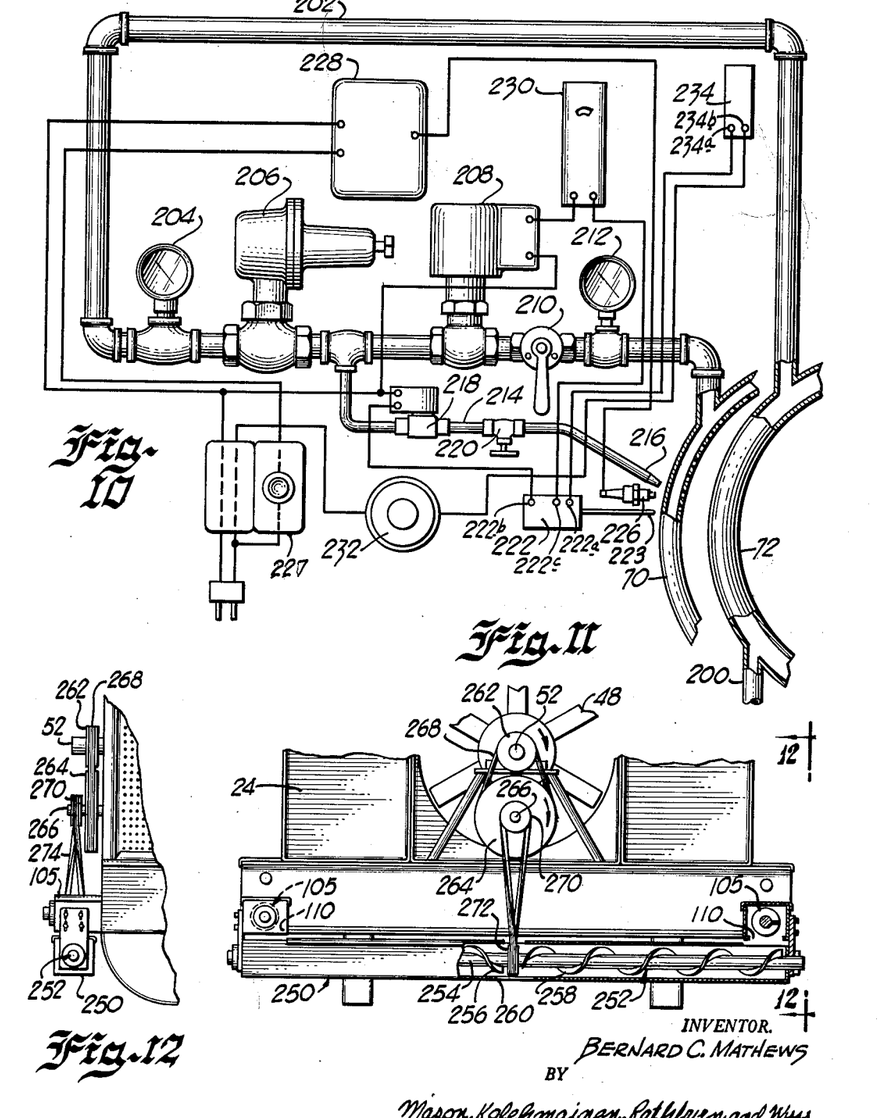
FIG. 10 is a schematic view illustrating the fuel control system of the improved grain dryer.
FIG. 11 is a partial rear view of another embodiment of the improved grain dryer illustrating a modified grain discharge means.
FIG. 12 is a side view of the grain discharge means of FIG. 11.

The fuel control system for the dryer is shown diagrammatically in FIG. 10. It will be understood, of course, that the present dryer may be adapted for various types of fuel. However, as illustrated, the dryer is adapted to operate on a liquid-gaseous fuel, and, referring to FIG. 10, liquid fuel is supplied from a tank (not shown) through an inlet pipe 200 near the bottom of the vaporizer 72 which is positioned in the path of the heated air from the burner 70. The liquid fuel in the vaporizer 72 is vaporized to the gaseous state and passes out of the top of the vaporizer 72 through a gas supply line 202 to be returned to the burner 70. The gaseous fuel in the supply line passes through a pressure gauge 204 and a pressure regulator 206 and then through a main solenoid valve 208, a hand valve 210 and a second pressure gauge 212 before entering the burner 70. After passing through the pressure regulator 206, a portion of the gaseous fuel is tapped off from the main supply line through a pilot line 214 and passes to a pilot nozzle 216 through a pilot solenoid valve 218 and a hand valve 220.

In operation, the burner is under the control of an electric fuel control system. Specifically, the system is started by opening the hand valve 220 on the pilot line 214 and the hand valve 210 on the main supply line and pressing the main on-off switch 221 of the system which supplies A.C. power to the primary of an ignition transformer 228 so as to provide an ignition spark at a spark plug 226 connected to the secondary of the transformer 228. Before a pilot flame can be established by the spark produced at the spark plug 226, it is necessary for the pilot solenoid 218 to open. However, the pilot solenoid 218 is connected in series with a pilot control unit 222, a high limit temperature control unit 234 and a pressure sensitive switch 232 to the A.C. supply. Accordingly, it is necessary for a circuit to be completed through all of the units 222, 234 and 232 before the pilot solenoid 218 can be energized from the A.C. supply.

The high limit temperature control unit 234 is a bimetal element in which the terminals 234a and 234b are connected together unless the temperature in the hot air chamber 58 rises above a permissible level. The pressure sensitive switch 232 is only closed to complete a circuit therethrough during periods when a certain predetermined pressure exists in the chamber 58. Accordingly, the switch 232 will only be closed to complete the circuit when the fan element 50 is operating and grain is placed in the drying columns 32 so that an air pressure can build up in the chamber 58. If either the fan is turned off or grain is not present in the columns 32 then the air pressure is reduced in the chamber 58 by an amount sufficient to open the contacts of the pressure switch 232.

The pilot control unit 222 is provided with a gas or liquid filled tube 223 which is positioned adjacent the pilot flame produced at the nozzle 216 upon ignition by the spark plug 226. Initially, that is before the pilot flame is produced, the pilot control unit 222 is arranged to connect the terminals 222a and 222b thereof together so that if the required air pressure has been built up in the chamber 58 and the high temperature limit is not exceeded, A.C. power is supplied to the pilot solenoid 218 with the result that the pilot solenoid valve is opened and gas is supplied to the nozzle 216.

The resultant pilot flame heats the tip of the tube 223 so as to expand the gas or liquid therein and the pilot control unit 222 responds to this increase in pressure in the tube 223 by establishing a connection between the terminals 222a and 222c thereof, while, at the same time maintaining the previous connection between the terminals 222a and 222b. The terminal 222c is connected in series with a main temperature control unit 230 and a main solenoid valve 208 to the other side of the A.C. line. Accordingly, the pilot control unit 222 will then energize the main solenoid 208 so that the main solenoid valve is opened and gas is supplied to the main burner 70. The desired operating temperature can be set on the main temperature control 230 and this control functions to turn the main solenoid 208 on and off as required so as to maintain the selected operating temperature in the chamber 58.

It will be noted from the above that if the contacts of the pressure switch 232 are opened, as a result either of an absence of grain in the grain columns 32 or if the fan element 58 is not functioning properly, the circuit is broken to both the main solenoid 208 and the pilot solenoid 218 so that both of the valves controlled by these solenoids are closed and the fuel supply system is shut off. Also, if the maximum permissible temperature in the chamber 58 is exceeded so that the contacts of the control unit 234 are opened both of the solenoids 208 and 218 are likewise deenergized so that the fuel supply system is shut off. The above described circuit connections to the pilot solenoid 218 and the main solenoid 208 thus cannot be established unless and until the desired temperature and pressure conditions exist in the hot air chamber 58. However, as soon as these conditions are re-established the push button 221 may again be actuated so as to restart the control system in the manner described above.

Referring now to the grain discharge means shown in the embodiments of FIGS. 11 and 12, the grain dryer 20 is provided with a transverse auger chamber 250 at the rear end of the grain dryer which is positioned so that the grain discharged by the feed augers 105 and 105' through the discharge openings 110 will fall into the ends of the auger chamber 250. The auger chamber 250 contains a feed screw auger 252 including an auger shaft 254 and a pair of helical feed vanes 256 and 258. The helical feed vane 256 has a right-hand helix and the helical feed vane 258 has a left-hand helix so that rotation of the feed auger 252 moves grain discharged from the discharge openings 110 at opposite sides of the dryer 20 toward the center of the auger chamber 250 to be discharged through a central grain discharge opening 260. The grain may be removed from the discharge opening 260 in any desired manner, for example, the grain may discharge onto another conveyor or feed auger to be carried and loaded into a wagon or truck.

In order to drive the feed auger 252, there is provided at the rear of the grain dryer 20 a drive pulley 262 keyed or otherwise secured to the main drive shaft 52. The drive pulley 262 is drivingly connected to an idler pulley 264 on an idler shaft 266 through a belt 268 so that the pulley 264 is driven at reduced speed. Also keyed or otherwise secured to the idler shaft 266 is a second drive pulley 270 which is connected through a drive belt 274 to an auger pulley 272 keyed or otherwise secured to the auger shaft 254. The shaft 52 may also be used as a source of power for the feed auger which is used to load the grain into a wagon or truck.

Figures 13, 13A, 14, 14A:
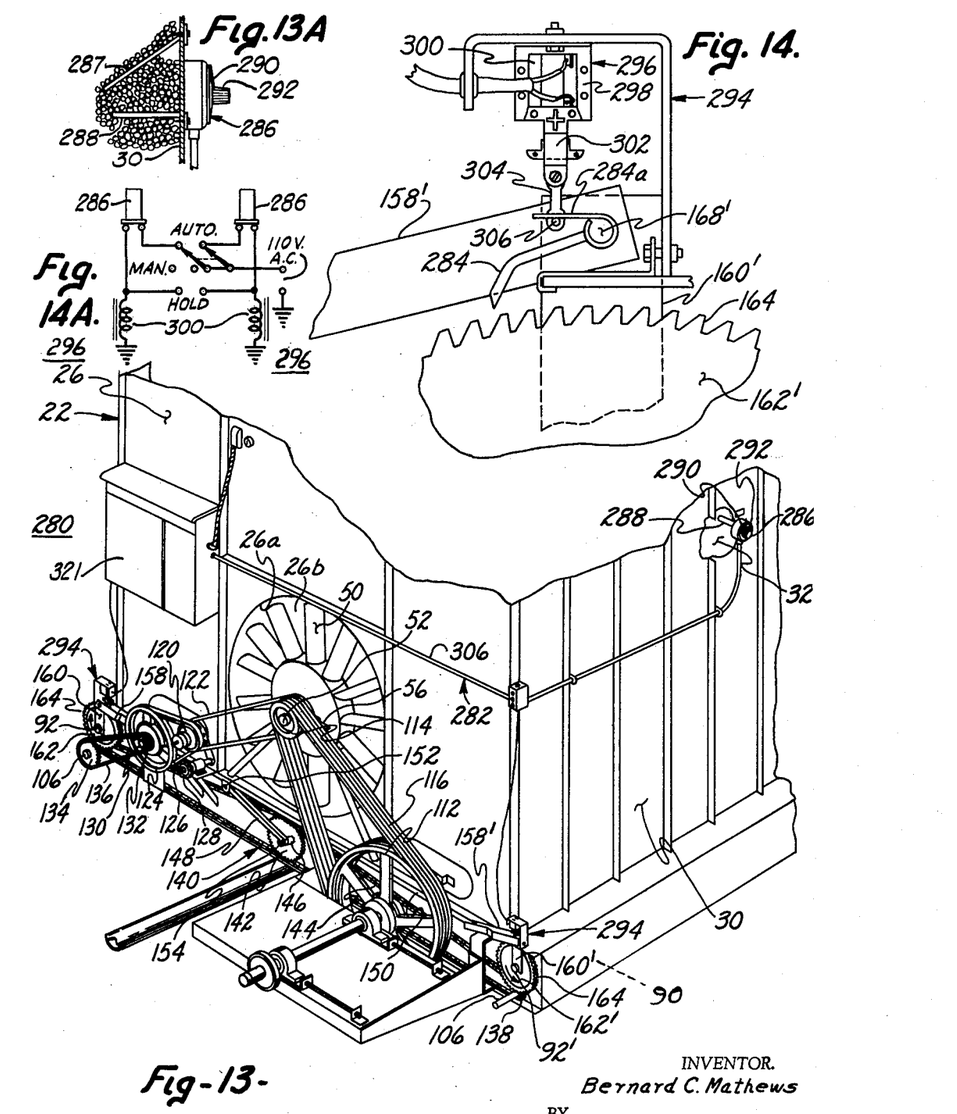
FIG. 13 is a partial front view in perspective illustrating an alternative grain dryer provided with an improved moisture control system.
FIG. 13A is a sectional view of the thermostatic control unit employed in the dryer of FIG. 13.
FIG. 14 is a front detailed view of the ratchet feed mechanism in the moisture control system of FIG. 13.
FIG. 14A is a schematic diagram of the moisture control switching arrangement employed in the dryer of FIG. 13.

Referring now to the moisture control system illustrated in the embodiment of FIGS. 13 and 14, there is illustrated a grain dryer 280, similar to the embodiments heretofore described, provided with means to automatically control the speed of the grain passing through the dryer to provide the desired moisture content in the discharged grain. Since the grain dryer 280 is similar to that heretofore described, the same numerals are used in FIGS. 13 and 14 to identify corresponding components of the previously described embodiments.

As heretofore described, the improved grain dryer 280 includes the box-shaped housing 22 having the front wall 26 and the inner perforated side wall (not shown) and outer perforated side wall 30 respectively connected to form the pair of grain columns 32 at the sides thereof. The grain columns 32 have an identical shape to heretofore described and best illustrated in FIG. 2. The grain dryer 280 is provided with the drying or hot air fan or fan element 50 and the cooling or cold air fan or fan element near opposite ends of the drive shaft 52 and each connected to force air through the grain columns 32. Moreover, as best illustrated in FIGS. 2 and 3 of the drawings, the grain dryer 280 is divided into an upper or hot air chamber for heating and drying the grain and a lower or cold air chamber for cooling the dried grain. The grain in the upper portions of the grain columns 32 is dried by the passage of heated air through the grain columns and through the perforations in the inner and outer side walls. The heated air, of course, heats the grain in addition to drying the grain. The moisture removed from the grain is a function of the temperature of the grain passing through the columns 32. As the grain passes through the grain columns 32, the heated grain is cooled by the passage of cool air from the lower air chamber through the perforations in the inner and outer sidewalls below the partitions in the dryer 280.

As heretofore described, in order to discharge the grain from the grain columns 32, there is provided along each side of the dryer and adjacent the bottom of each drying column the pair of grain discharge mechanisms indicated generally at 90. The grain discharge mechanisms similar to those heretofore described in connection with the embodiments of FIGS. 1 through 12 are employed in the dryer 280 and hence are not hereinafter described in detail. However, briefly, the grain discharge mechanisms 90 respectively include the metering shafts 92 and 92' rotatable in intermittent angular steps in the directions of the arrows in FIG. 13. By varying the angular distance that the shafts 92, 92' are moved for each step by the positioning of the hinge 154 along the crank bar 146 (best illustrated in FIG. 5) and by changing the repetitive rate of this stepping action by adjustment of the hand wheel 128, the amount of grain discharged from the metering devices may be accurately controlled over a wide range of values.

In the arrangement of FIGS. 1 to 12, inclusive, the main thermostat 230 functions to maintain a selected temperature of the heated air in the chamber 58. Such an arrangement is preferably retained in the dryer 280 of FIGS. 13 and 14 so that the desired operating temperature conditions can be established which will accomplish fast drying without overheating, checking or discoloring the grain. However, in the dryer 280 there is provided an additional moisture control system which functions automatically to control the grain discharge mechanisms 90 independently in accordance with the actual temperature of the grain in each column. More particularly, a control system is provided for rendering the pawl 284 of each grain discharge mechanism, which corresponds to the pawl 166 in FIG. 8, operative or inoperative to advance the ratchet wheels 162, 162' in response to reciprocation of the slide bar 150.

In order to provide for the temperature control of the moisture control system, an adjustable thermostatic control 286 is mounted at each side of the grain dryer (only one of which is illustrated in FIG. 13) near the bottom of the drying section, with a temperature sensing bulb 288 extending through the sidewall 30 into the grain column 32. Preferably, an inclined protective arm 287 is mounted on the sidewall 30 above the bulb 288 so as to protect the bulb 288 from damage due to the weight of the grain when the column is filled. However, the arm 287 is positioned so that the grain is in intimate contact with the bulb 288, as best shown in FIG. 13A. The thermostatic control 286 is provided with a numbered dial 290 as a guide indicator for setting a control knob 292 of the thermostatic control 286. The thermostatic control 286 may be of any well known suitable type and is provided with a snap action on-off switch normally closed and arranged to open when the temperature of the grain in the grain column 32 reaches a preselected level as determined by the setting of the knob 292 on the dial 290.

In order to start and stop the feeding of grain out of the drying columns in response to the operation of the thermostatic controls 286, there is provided a pair of automatic feed controls 294, each operatively associated with a corresponding one of the thermostatic controls 286 and operatively connected to engage or disengage the ratchet pawls 284 from the corresponding ratchet wheels 162, 162'. As best illustrated in FIG. 14, each of the automatic feed controls includes a pull type electrical solenoid 296 having a frame portion 298 carrying an electrical winding 300. A solenoid armature or plunger 302 is operatively positioned with the frame 298 to be moved relative to the frame thereof when the coil 300 is energized in response to the closing of the snap acting switch in the thermostatic control 286. The pawls 284 are mounted for pivotal movement on the respective pivot pins 168, 168' which pivotally interconnect the levers 160, 160' to the yoke end of the arms 158, 158' and the pawl 284 adapted to advance as selected number of teeth 164 of the ratchet wheels 162, 162' for each reciprocation of the slide bar 150, thereby to advance the ratchet gears 162, 162' a predetermined distance and rotate the shafts 92, 92', respectively.

The pawl 284 is interconnected with the plunger 282 of the solenoid 296 so that the pawl 284 is inoperative to engage respective teeth 164 of the ratchet wheels 162, 162' when the solenoid 296 is energized. This is readily accomplished by providing the plunger 302 with a link 304 at its lower end provided with a pin 306 positioned to engage a tongue 284a on the pawl 284 and pivot the pawl 284 out of engagement with the teeth 164 when the solenoid 296 is energized. It will be appreciated that when the solenoid 296 is deenergized, the plunger 302 thereof drops out of the way of the tongue 284a so that the tongue 284a is no longer in sliding engagement with the pin 306 and the pawl 284 is then effective to engage the teeth 164, 164'. Each of the thermostatic controls 286 and their respective automatic feed controls 294 are serially connected across a source of alternating current in the manner shown in FIG. 14A and as indicated by the electrical line 306 in FIG. 13.

Although the operation of the improved grain dryer 280 is believed clear from the above description, briefly, it will be understood that when the grain is initially loaded into the grain dryer 280 and the grain columns 32 thereof are initially filled, the temperature of the grain will be sufficiently low that the thermostatic control 286 is closed, the electrical solenoid 296 in the automatic feed control 294 being energized. Such energization of the solenoid 296 is effective to cause the tongue 284a of the pawl 284 to be engaged by the pin 306 on the plunger 302 and lift the pawl 284 out of engagement with the teeth 164' of the ratchet wheel 162'. When the temperature of the grain in the columns 32 reaches the temperature set by the control knob 292 of the thermostatic control 286, the control 286 opens, deenergizing the solenoid 296 in the automatic feed control 294. Such deenergization permits the pawl 284 to engage the teeth 164' of the ratchet wheel 162' to advance the grain discharge mechanism controlled thereby. Moreover, any variation in the temperature of the grain in the columns 32 will operate the thermostatic controls 286 to energize or deenergize the solenoids 296 thereby to control the discharge of the grain from the grain dryer 280.

The moisture control system providing independent moisture control for each of the grain columns 32 is particularly advantageous for accurate moisture control of the grain. Such control is useful, for example, where a strong wind at one side of the dryer 280 can offset some of the air from the drying fan so that while one side may be drying well the grain comes out of the other side with a higher moisture content. In the absence of independent controls on the grain columns 32, it would then be necessary to slow up the drying process, which would incidentally reduce capacity. The automatic moisture control speeds up the drying and removes the human factor from the setting of the controls. Moreover, if a load of wet grain is placed in the dryer and thereafter the next load has a different moisture content, the moisture control system 282 will adjust to the various conditions and all of the grain will come out of the grain dryer 280 with the desired moisture content. Additionally, if the heat should fail, no grain will come out of the dryer because of both the main safety controls of the dryer and the moisture control system itself.

In certain instances it is desirable to provide for discharge of the grain independently of the above described moisture control system, as for example when the last portion of the grain below the control 286 is to be discharged. In other instances it is desirable to hold the grain within the column irrespective of the condition of the control 286. To this end, a switching arrangement is provided as shown in FIG. 14A wherein a three position switch 320 is provided. The control switch 320 has an automatic position, as shown in FIG. 14A, in which position the discharge of grain is controlled by the moisture control units 286 as described heretofore. When the switch 320 is in its mid or manual position the solenoid coils 300 are not energized so that the pawls 284 are continuously down and engage the ratchet wheels 162, 162' so that grain is discharged continuously, as described heretofore in connection with the arrangement of FIGS. 1 to 12, inclusive. When the switch 320 is in its lower or hold position the controls 286 are bypassed and the solenoid coils are continuously energized so that the pawls 284 are continuously held out of engagement with the ratchet wheels 162, 162' and the grain is held within the respective grain columns during this period. The hold position is normally employed as the dryer is initially filled, the heated air is being brought up to temperature and the first portion of the grain is heated to the desired temperature. The manual position is normally used to discharge the last portion of the grain within the column below the control 286. The switch 320 is preferably located within the control box 321 in which the other dryer control units shown in FIG. 10 are also located.

While the present invention has been described in connection with particular embodiments of the invention, it will be understood that various modifications may be made therein which are within the true spirit and scope of the invention as defined in the appended claims.

What is claimed as new and desired to be secured by Letters Patent of the United States is:

1. A continuous grain dryer, comprising means defining a pair of opposed grain columns each having perforated side walls and terminating in a lower discharge opening, heating means for heating air, means directing heated air through one portion of said columns so that grain passing downwardly through said columns is dried, a vaned metering shaft positioned adjacent each of said discharge openings, means including a pawl and ratchet wheel for rotating each of said metering shafts to discharge grain from said columns at a predetermined rate, and means responsive to the temperature of the grain in each of said columns and arranged to control the periods of engagement of each pawl and ratchet wheel independently in accordance with the temperature of the grain in the associated column.

2. A continuous grain dryer as set forth in claim 1, wherein said temperature responsive means includes a pair of control units each having an element in thermal association with the grain in one of said columns and contact means controlled by said element, and a pair of solenoids individually controlled by said contact means and each having an armature structure connected to one of said pawls for controlling engagement thereof with the corresponding ratchet wheel, whereby each of said pawl and ratchet wheel combinations is independently controlled to be engaged during periods when the grain in the associated grain column is above a predetermined temperature.

3. A continuous grain dryer as set forth in claim 1, wherein said temperature responsive means includes a pair of control units each having an element in thermal association with the grain in one of said columns and contact means controlled by said element, a pair of solenoids individually controlled by said contact means and each having an armature structure connected to one of said pawls for controlling engagement thereof with the corresponding ratchet wheel, and means operable independently of said elements for controlling periods of engagement of said pawl and ratchet wheel combinations.

4. A continuous grain dryer, comprising means defining a pair of opposed grain columns each having perforated side walls and extending between end walls of the dryer, grain discharge means positioned at the bottom of each of said columns for removing dried grain therefrom, a horizontal partition positioned between said columns and dividing the space between said columns and said end walls into upper and lower chambers, a driveshaft positioned below said partition and extending between said end walls above the bottoms of said grain columns, a first fan element on one end of said driveshaft, a second fan element on the other end of said driveshaft, means including a ring burner positioned around said driveshaft in the vicinity of said first fan element for heating air directed therethrough, an inclined partition extending from a point below said driveshaft to said horizontal partition, said inclined partition having an opening therein through which said driveshaft extends, housing means including said inclined partition for directing said heated air upwardly into said upper chamber for discharge through the upper portions of said columns, means for directing cooling air directly over that portion of said driveshaft between said ring burner and said inclined partition to prevent overheating of said driveshaft, and means including said second fan element for directing cool air from the exterior of the dryer around said housing means and outwardly through the lower portions of said columns.

5. A continuous grain dryer, comprising means defining a pair of opposed grain columns each having perforated side walls and extending between end walls of the dryer, grain discharge means positioned at the bottom of each of said columns for removing dried grain therefrom, a horizontal partition positioned between said columns and dividing the space between said columns and said end walls into upper and lower chambers, a driveshaft positioned below said partition extending between said end walls above the bottoms of said columns, a first fan element on one end of said driveshaft, a second fan element on the other end of said driveshaft, means positioned in the vicinity of said first fan element for heating air directed therethrough, housing means surrounding a portion of said driveshaft for directing said heated air upwardly into said upper chamber for discharge through the upper portions of said columns, a protective sleeve surrounding the portion of said driveshaft which is positioned within said housing means, and means including said second fan element for directing cool air from the exterior of the dryer through said sleeve, around said housing means and outwardly through the lower portions of said columns.

6. In a grain dryer of the type provided with a vertically extending grain column terminating in an elongated discharge opening, the combination of, means defining an inclined side wall extending downwardly from one edge of said discharge opening and transversely to a point beyond the other edge of said discharge opening, said side wall terminating in an upwardly inclined outer lip portion, a metering device positioned above said side wall adjacent said outer lip portion thereof, said device including a longitudinally extending metering shaft horizontally offset beyond said other edge of said discharge opening and having a plurality of radially extending blades, the outer edges of said blades being spaced from said outer lip portion by an amount greater than the largest dimension of the grain to be metered but less than the separation at which grain will flow over said lip portion in the absence of rotation of said shaft, a ratchet wheel on said shaft, a reciprocating member having a pawl adapted to engage said ratchet wheel as said member reciprocates and rotate said metering shaft in intermittent angular steps so that grain below said shaft is pushed over said lip portion, means for moving said pawl to a position out of engagement with said ratchet wheel so that grain can be retained in said column despite reciprocation of said member, and means positioned below said lip portion for receiving grain pushed thereover in accordance with rotation of said metering shaft.

References Cited in the file of this patent

UNITED STATES PATENTS

| | | |
|---|---|---|
| 1,669,012 | Nordstrom | May 8, 1928 |
| 2,410,851 | Welty | Nov. 12, 1946 |
| 2,552,093 | Gollbach | May 8, 1951 |
| 2,701,920 | Campbell | Feb. 15, 1955 |
| 2,706,345 | Arndt | Apr. 19, 1955 |
| 2,740,204 | Seltzer | Apr. 3, 1956 |
| 2,799,097 | Williams | July 16, 1957 |
| 2,858,620 | Naylor | Nov. 4, 1957 |
| 3,000,110 | Forth | Sept. 19, 1961 |
| 3,053,522 | Applegate | Sept. 11, 1962 |
| 3,092,472 | Figley | June 4, 1963 |
| 3,097,934 | Applegate | July 16, 1963 |